Feb. 20, 1934.　　　M. E. BENNETT　　　1,948,412
SPRING OR RESILIENT WHEEL
Filed Aug. 25, 1933　　　2 Sheets-Sheet 2

Moses E. Bennett,
INVENTOR

BY Victor J. Evans & Co.
ATTORNEY

P. T. Hickey
WITNESS

Patented Feb. 20, 1934

1,948,412

UNITED STATES PATENT OFFICE 1,948,412

SPRING OR RESILIENT WHEEL

Moses Edwin Bennett, Detroit, Mich., assignor of one-fourth to Fred Blackwell and one-fourth to Fred Carmon, Detroit, Mich.

Application August 25, 1933. Serial No. 686,830

4 Claims. (Cl. 152—47)

The invention relates to a wheel construction for vehicles and more especially to spring or resilient wheels.

The primary object of the invention is the provision of a wheel of this character, wherein its rim is designed to carry a rubber tire shoe or casing and is devoid of an inner tube yet the wheel will have maximum resiliency to withstand shocks and jars incident to road travel, the wheel being designed more especially for heavy duty for use on busses or other vehicles and will eliminate injury or damage resultant from blow-outs as is common in pneumatic tires.

Another object of the invention is the provision of a wheel of this character wherein the use of an inner tube is entirely eliminated and it will give the public a better and more lasting comfort when riding and will remove the danger or injury from blow-outs when travelling at rapid speeds and thus avoiding the necessity of pumping tires or repairs due to puncture as is common with the pneumatic tires.

A further object of the invention is the provision of a wheel of this character which is comparatively simple in construction, thoroughly reliable and efficient in its purpose, having maximum resilient qualities, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings.

Similar reference characters indicate corresponding parts throughout the several views in the drawings.

Figure 1:
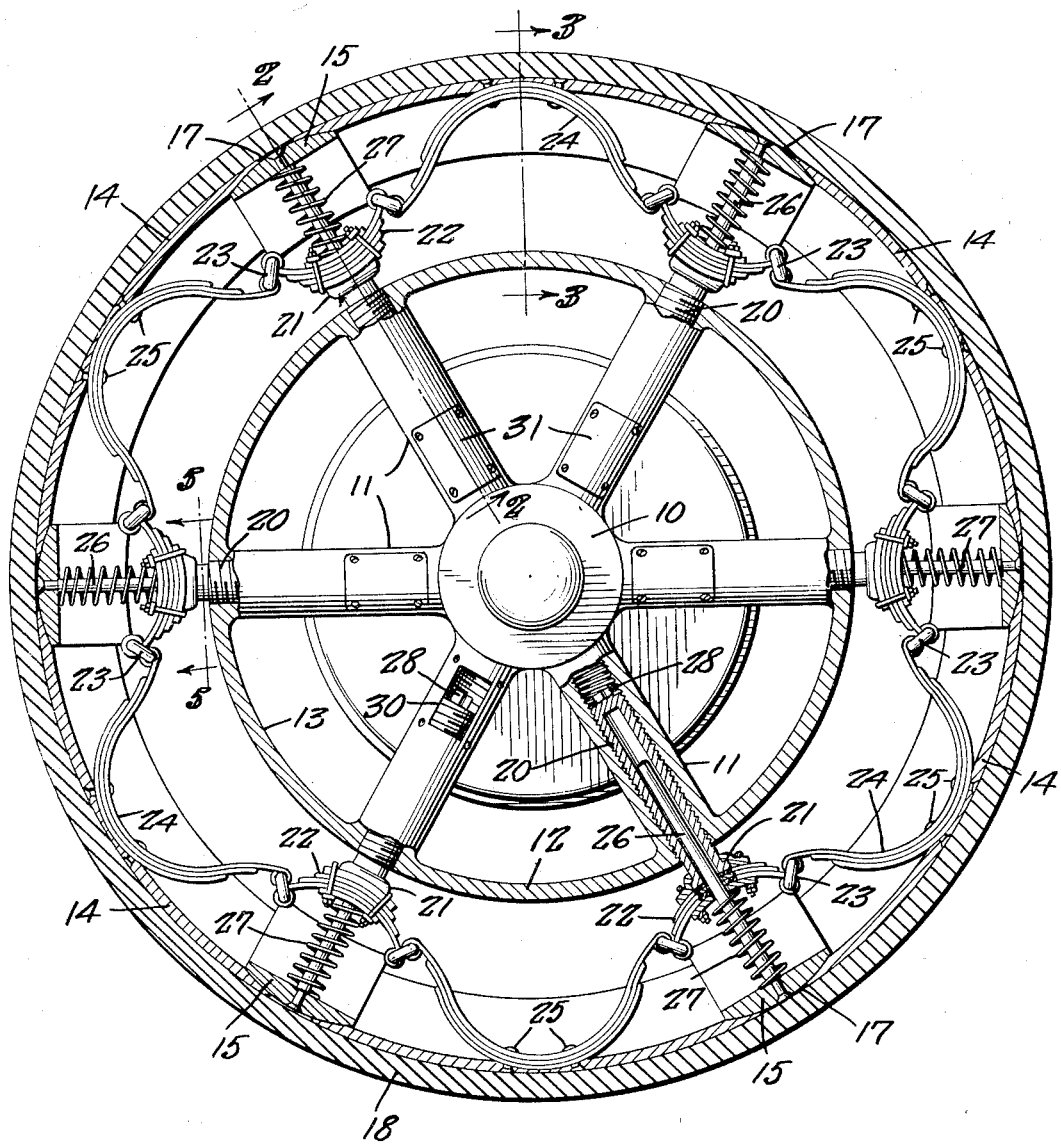
Figure 1 is a vertical sectional view of a wheel constructed in accordance with the invention.
Figure 2:
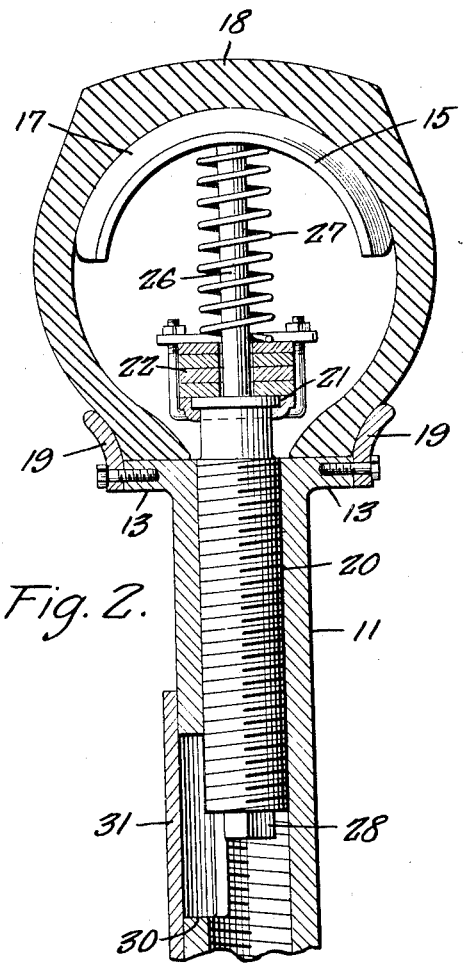
Figure 2 is a fragmentary sectional view on the line 2—2 of Figure 1 looking in the direction of the arrows and on an enlarged scale.
Figure 3:
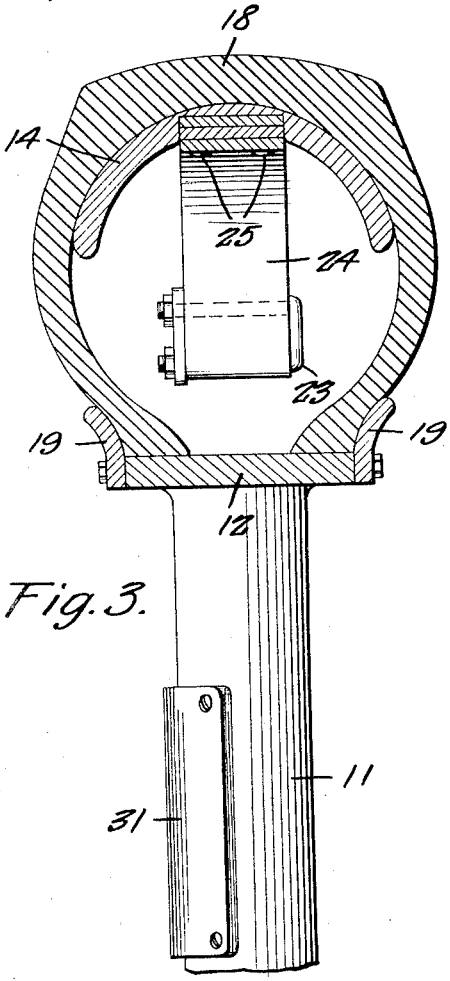
Figure 3 is a sectional view on the line 3—3 of Figure 1 looking in the direction of the arrows.
Figure 4:
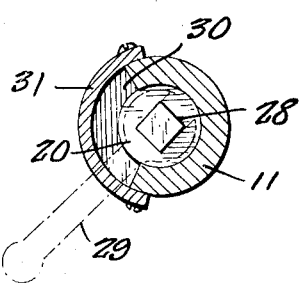
Figure 4 is a detail horizontal sectional view through one of the spokes of the wheel.
Figure 5:
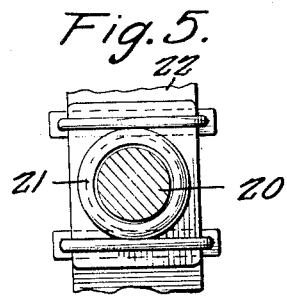
Figure 5 is a sectional view on the line 5—5 of Figure 1.

Referring to the drawings in detail, the wheel comprises a hub 10 having integrally formed therewith radially disposed tubular spokes 11, these merging into a felly 12 having at each side of the wheel a flange 13 concentrically formed with respect to the hub 10. Outside of this felly 12 is a series of sections 14 coacting with transversely arched saddles 15, the sections being in overlapping relation to said saddles and having their ends next thereto rounded in conformity with the outer rounded faces 17 of said saddles.

Carried by the felly 12 is a demountable rubber tire shoe or casing 18 supported between removable rim flanges 19 which are also carried by the felly 12 at the inner and outer side edges thereof.

Threaded into the spokes 11 through the outer open ends thereof are tubular barrels 20, these being swiveled at 21 to inwardly arched multi-ply springs 22 which, through the links 23 at the ends thereof, are connected with the ends of outwardly arched multi-ply springs 24, these medially thereof being made fast at 25 to the sections 14 of the felly intermediate of their extent.

Fixed centrally to the saddles 15 are plungers 26, these telescoped in the barrels 20 and coiled about the outer end portions of said plungers are compression springs 27 which are seated against the said saddles 15 and the springs 22.

The inner ends of the barrels 20 have formed thereon wrench-engaging lugs 28 for accommodating a wrench 29 and accessible through openings 30 in the respective spokes 11 adjacent to the hub 10. The openings are normally closed by removable cover plates 31. Thus it can be seen that the barrels 20 can be adjusted outwardly or inwardly with respect to the spokes 11 to vary the tension action of the springs 22, 24 and 27 according to the duty required of the wheel in its use.

What is claimed is:

1. In a wheel construction, a hollow spoked hub, adjustable barrels mounted in the spokes, a felly formed with the spokes, a tire shoe demountable upon said felly, inwardly arched springs swiveled with the barrels and working within the shoe, saddles having plungers slidably fitted in the barrels, means for tensioning the plungers, and outwardly arched springs linked with said inwardly arched springs.

2. In a wheel construction, a hollow spoked hub, adjustable barrels mounted in the spokes, a felly formed with the spokes, a tire shoe demountable upon said felly, inwardly arched springs swiveled with the barrels and working within the shoe, saddles having plungers slidably fitted in the barrels, means for tensioning the plungers, outwardly arched springs linked with said inwardly arched springs, and means securing the outwardly arched springs to the felly.

3. In a wheel construction, a hollow spoked hub, adjustable barrels mounted in the spokes, a felly formed with the spokes, a tire shoe demountable upon said felly, inwardly arched springs swiveled with the barrels and working within the shoe, saddles having plungers slidably fitted in the barrels, means for tensioning the plungers, outwardly arched springs linked with said inwardly arched springs, the said spokes having openings close to the hub, and wrench-engaging ends formed on said barrels and accessible through the openings.

4. In a wheel construction, a hollow spoked hub, adjustable barrels mounted in the spokes, a felly formed with the spokes, a tire shoe demountable upon said felly, inwardly arched springs swiveled with the barrels and working within the shoe, saddles having plungers slidably fitted in the barrels, means for tensioning the plungers, outwardly arched springs linked with said inwardly arched springs, the said spokes having openings close to the hub, wrench-engaging ends formed on said barrels and accessible through the openings, and cover plates removably fitted on the hubs for closing said openings therein.

MOSES EDWIN BENNETT.